Patented Nov. 12, 1929

1,735,409

UNITED STATES PATENT OFFICE

MATHIAS PIER, OF HEIDELBERG, AND KARL WINKLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CARBON DISULPHIDE

No Drawing. Application filed January 5, 1928, Serial No. 244,770, and in Germany January 12, 1927.

The production of carbon disulphide from cheap initial materials is of considerable practical importance.

We have found that carbon disulphide, and in addition thereto, hydrogen or gases containing the same, are produced by treating hydrocarbons especially gaseous hydrocarbons such as methane, or gas mixtures containing the same, with gases furnishing sulfur especially hydrogen sulphide, at an elevated temperature, in the presence or absence of catalysts and, if desired, in the presence of gases containing oxygen. The temperatures employed should be at least 850° C. and should preferably not exceed 1500° C.

As examples of catalysts which are applicable in the present process may be mentioned aluminium oxid, active carbon silica gel, pumice stone, carborundum and the like.

Hydrocarbons, or gases containing hydrocarbons, such for example as natural gas, cracking gas, gases from the distillation of coal and the like, are available in large quantities. They may also be obtained in varying quantities by heating coal, tars, mineral oils and the like in the presence of hydrogen and with or without the application of pressure.

Hydrogen sulphide is also readily obtainable, as for example from gases containing the same. Thus it may be obtained as a by-product in the destructive hydrogenation of sulphur-bearing coals, and mineral oils such as Panuco oil and the like, especially when a high concentration of hydrogen is employed.

The initial gaseous mixture may also contain other gases, such as hydrogen or nitrogen. It is preferable to operate with the hydrogen sulphide in excess in relation to the hydrocarbons.

The conversion of hydrogen sulphide with hydrocarbons into carbon disulphide and hydrogen may according to this invention be carried out with good results as regards yield, which may be as high as say 50 per cent or even more, on an industrial scale, by passing a mixture of 1 part of a gaseous mixture containing methane such as is obtained from the exhaust gases from the destructive hydrogenation of coal, by scrubbing and the like, and 2 parts of hydrogen sulphide, through earthenware pipes at 1000° centigrade, the resulting product being then preferably cooled quickly. The conversion may also be effected by an electric arc of either direct- or alternating-current, preferably of high frequency and high voltage.

The process may also be carried out by passing the mixture of hydrogen sulphide and hydrocarbons over carbon serving as an electric heating resistance; or the gaseous mixture may be introduced into producers which are previously strongly heated with air or oxygen. The heat, however generated, is preferably rendered useful again by regeneration.

It may also be advisable to subject the gaseous mixture to repeated treatment in the said manner with or without intermediate removal of the resulting products.

Instead of hydrogen, a gaseous mixture containing the same, such as water gas, may be produced in association with the carbon disulphide, by a concurrent process of partial combustion by means of added gases containing oxygen, such for example as air, oxygen, carbon dioxid, and the like.

The resulting carbon disulphide is condensed, for example, by cooling or compression, or both, or recovered by washing with solvents or by adsorption with suitable solid bodies, such as active charcoal, or by the application of several of these measures.

The said carbon disulphide when recovered is in a high state of purity, or can be brought into that condition by simple treatment, and may be used for example as a solvent or, for example in the artificial silk industry. The recovered hydrogen, or gases containing the same, may be used for various purposes, such as in the destructive hydrogenation of coal, tar, mineral oils and the like, under pressure, for the purpose of obtaining liquid products of the type of the intermediate oils, Diesel oils, benzines and the like, or for the synthesis of ammonia, or for catalytically hydrogenating carbon monoxid in the preparation of methanol and other products containing oxygen and also in the preparation of hydrocarbons.

The undecomposed hydrocarbon gases may be utilized or further treated in various ways. For example, they may be decomposed by means of oxygen, air, water or carbon dioxid, or be utilized for the production of additional hydrogen by cracking.

The following example will further illustrate the nature of the said invention which, however, is not limited thereto.

*Example*

A mixture of methane and hydrogen sulphide, approximately in the proportion of 1:2 volumes is passed through a porcelain tube filled with lumps of earthenware and heated to 1000° centigrade. The issuing gases are cooled to a low temperature, whereby the whole of the carbon disulphide formed is condensed, together with a large proportion of the undecomposed hydrogen sulphide. The latter is allowed to vaporize and the residual carbon disulphide is purified by distillation. In a single passage through the apparatus, about 50 per cent of the sulfur contained in the hydrogen sulphide is recovered as carbon disulphide.

What we claim is:

1. The process for the production of carbon disulphide and hydrogen, which comprises treating a gas comprising hydrocarbons with a gas furnishing sulfur at an elevated temperature of at least 850° C.

2. The process for the production of carbon disulphide and hydrogen, which comprises treating a gas containing hydrocarbons with a gas furnishing sulfur at about 1000° C.

3. The process for the production of carbon disulphide and hydrogen, which comprises treating a gas comprising hydrocarbons with a gas furnishing sulfur at an elevated temperature of at least 850° C. in the presence of a gas containing oxygen.

4. The process for the production of carbon disulphide and hydrogen, which comprises treating a gas comprising hydrocarbons with hydrogen sulphide at an elevated temperature of at least 850° C.

5. The process for the production of carbon disulphide and hydrogen, which comprises treating methane with hydrogen sulphide at an elevated temperature of at least 850° C.

6. The process for the production of carbon disulphide and hydrogen, which comprises treating methane with hydrogen sulphide at about 1000° C.

In testimony whereof we have hereunto set our hands.

MATHIAS PIER.
KARL WINKLER.